United States Patent [19] 
Habicht et al.

[11] 3,843,797
[45] Oct. 22, 1974

[54] SALURETIC AND DIURETIC COMPOSITIONS AND METHOD WITH 2,3-DIHYDRO-5-(2-NITRO-1-ALKENYL)-BENZOFURAN-2-CARBOXYLIC ACIDS AND PHARMACEUTICALLY ACCEPTABLE SALTS

[75] Inventors: Ernst Habicht, Oberwil/bl, Switzerland; Bernard Libis, Saint-Louis, France; Anos Zergenyi, Riehen, Switzerland

[73] Assignee: Ciba-Geigy Corporation, Ardsley, N.Y.

[22] Filed: Aug. 9, 1972

[21] Appl. No.: 278,887

Related U.S. Application Data

[62] Division of Ser. No. 90,032, Nov. 16, 1970, Pat. No. 3,726,904.

[30] Foreign Application Priority Data

Nov. 20, 1969 Switzerland .................... 17273/69

[52] U.S. Cl. .................. 424/285, 424/275
[51] Int. Cl. ............................ A61k 27/00
[58] Field of Search ..................... 424/275, 285

[56] References Cited
UNITED STATES PATENTS
3,627,785  12/1971  Zergenyi et al. ............. 260/346.2

Primary Examiner—Albert T. Meyers
Assistant Examiner—Daren M. Stephens
Attorney, Agent, or Firm—John J. Maitner; Theodore O. Groeger; Joseph G. Kolodny

[57] ABSTRACT

Compounds of the class of 2,3-dihydro-5-(2-nitro-1-alkenyl)-benzofuran- and 2,3-dihydro-5-(2-nitro-1-alkenyl)-benzo[b]thiophene-2-carboxylic acid and pharmaceutically acceptable salts thereof have diuretic and saluretic activity; pharmaceutical compositions containing such compounds and methods of producing diuresis and saluresis in mammals comprising administering them are provided; a typical embodiment is 2,3-dihydro-5-(2-nitro-1-propenyl)-6,7-dimethyl-benzofuran-2-carboxylic acid.

4 Claims, No Drawings

SALURETIC AND DIURETIC COMPOSITIONS AND METHOD WITH 2,3-DIHYDRO-5-(2-NITRO-1-ALKENYL-BENZOFURAN-2-CARBOXYLIC ACIDS AND PHARMACEUTICALLY ACCEPTABLE SALTS

This is a division, of application Ser. No. 90,032, filed Nov. 16, 1970, now U.S. Pat. No. 3,726,904.

DETAILED DESCRIPTION

The present invention realtes to heterocyclic carboxylic acids and salts thereof, processes for the production thereof, pharmaceutical compositions containing such compounds and the use thereof.

More particularly, the present invention relates to compounds of the formula

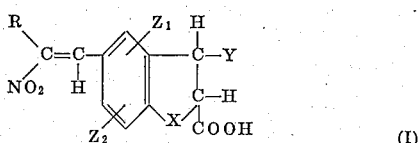

(I)

wherein
X is oxygen or sulfur,
Y is hydrogen or methyl,
$Z_1$ is fluoro, chloro, methyl or methoxy,
$Z_2$ is hydrogen or methyl, and
R is alkyl having from 1 to 5 carbon atoms, or a pharmaceutically acceptable salt thereof.

These compounds have been found to possess valuable pharmacological properties. In particular, they have a diuretic and saluretic activity which is combined with a high therapeutic index. These properties characterise the compounds of the invention as being suitable for the treatment of disturbances caused by insufficient excretion of urine and of electrolytes, especially of sodium chloride. Such disturbances are the cause of edema and hypertension. The new substances administered orally in low doses to mammals increase the excretion of urine and of sodium and chlorine ions to a considerable extent.

In the compounds of the formula I, $Z_1$ and $Z_2$ occupy the 4-, 6- or 7-position. As the alkyl group, R can be, e.g. the methyl, ethyl, propyl, isopropyl, butyl, isobutyl, sec.butyl, tert.butyl, pentyl, 2-methylpentyl, isopentyl, 2,2-dimethylpropyl, 1-methylbutyl, 1-ethylpropyl, 1,2-dimethylpropyl, or the tert.pentyl group.

Applying the first process according to the invention, compounds of the formula I are produced by reacting a compound of the formula II:

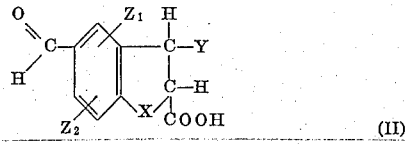

(II)

wherein X, Y, $Z_1$ and $Z_2$ have the meanings given under formula I, or a reactive functional derivative of such a compound, with a 1-nitroalkane of the general formula III:

wherein R has the meaning given under formula I; and, optionally, converting an obtained carboxylic acid with an inorganic or organic base into a salt.

Suitable reactive functional derivatives of compounds of the formula II are, e.g., compounds of the formula IIa:

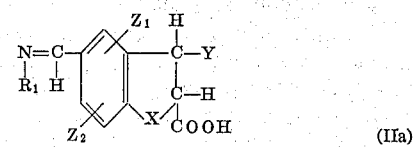

(IIa)

wherein
$R_1$ represents an alkyl, aryl or aralkyl group, and X, Y, $Z_1$ and $Z_2$ have the meanings given under formula I. As the alkyl group, $R_1$ is preferably a lower alkyl group, e.g., the ethyl, propyl, isopropyl, butyl, isobutyl, sec.butyl, tert.butyl, pentyl, isopentyl, 1-methylbutyl, or the hexyl group; as the aryl group, $R_1$ is, in particular, the phenyl group or a substituted phenyl group, e.g., the p-tolyl group; and as the aralkyl group, $R_1$ is, in particular, the benzyl group or the p-methylbenzyl group.

The reaction according to the invention of a compound of the formula II with a 1-nitroalkane is preferably performed in an inert solvent, in the presence of a condensation agent. Suitable condensation agents are, e.g., inorganic or organic bases, e.g., alkali hydroxides such as potassium or sodium hydroxide, alkali metal acetates such as sodium acetate, alkali metal alkanolates such as sodium methylate, primary organic bases such as ethylamine or butylamine, also secondary organic bases such as pyrrolidine, morpholine, or especially piperidine. Suitable inert solvents are hydrocarbons such as benzene or toluene, halogenated hydrocarbons such as chlorobenzene, ethereal liquids such as dioxane, carboxylic acids such as acetic acid, excess organic bases, or mixtures of the stated solvents, particularly a mixture of toluene and glacial acetic acid. Alkali metal alkanolates are preferably reacted in the corresponding alkanols, alkali hydroxides in methanol or ethanol, and alkali metal acetates in acetic acid.

In the process according to the invention it is possible to use one molar equivalent of aldehyde of the formula II and one molar equivalent of 1-nitroalkane, preferably, however, an excess of 1-nitroalkane is used. The reaction can be performed at ca. 20°–150°C. Reactions in solvents at elevated temperature are preferably carried out at the boiling temperature of the reaction mixture.

Furthermore, compounds of the formula IIa can be reacted according to the invention with 1-nitroalkanes. The compounds of the formula IIa may also be obtained as intermediate products using the first embodiment of the process by carrying out the reaction of the aldehydes of the formula II with 1-nitroalkanes in the presence of primary amines as condensation agents.

Starting with compounds of the formula IIa, the process according to the invention is preferably performed in an anhydrous alkanoic acid, e.g., acetic acid.

With the reaction of one molar equivalent of a compound of the formula IIa with one molar equivalent of 1-nitroalkane of the formula III, one molar equivalent of primary amine is split off, which is preferably bound to excess alkanoic acid. It is advantageous to use excess 1-nitroalkane in the process. The reaction can be performed at ca. 20°–130°C; the reaction mixture is preferably reacted at the boiling temperature.

Starting materials of the formula II are not described in the literature. They can be produced, for example, by condensing a compound of the formula II*b*:

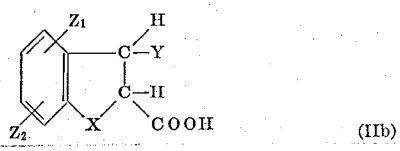

wherein X, Y, $Z_1$ and $Z_2$ have the meaning given under formula I, with a dichloromethylalkyl ether, in the presence of a Friedel-Crafts catalyst, in an inert solvent. In the process is used, for example, dichloromethylmethyl ether in nitrobenzene in the presence of aluminium chloride.

Compounds described in the literature which are embraced by the formula II*b* are 2,3-dihydro-6-methoxybenzofuran-2-carboxylic acid [cp. W. Will and P. Beck, Chem.Ber. 19, 1783 (1886)] and 2,3-dihydro-3,6-dimethylbenzofuran-2-carboxylic acid [cp. K. Fries and G. Fickewirth, Ann.Chem. 362, 49 (1908)]. Further 2,3-dihydrobenzofuran derivatives of the type II*b* can be produced analogously.

A 2,3-dihydrobenzo[b]thiophene derivative which is embraced by the formula II*b* is 2,3-dihydro-6-chlorobenzo[b]thiophene-2-carboxylic acid, which is produced, for example, as follows: Rhodanine is condensed with 2,4-dichlorobenzaldehyde in the presence of sodium acetate in glacial acetic acid to give 5-(2,4-dichlorobenzylidene)-rhodanine, which is hydrolysed with dilute sodium hydroxide solution to 2,4-dichloro-α-mercaptocinnamic acid, the obtained carboxylic acid is condensed with the aid of sodium methylate in diethylene glycol to 6-chlorobenzo[b]thiophene-2-carboxylic acid, which is reduced with the aid of aqueous sodium amalgam. Further 2,3-dihydrobenzo[b]thiophene derivatives of the formula II*b* can be produced analogously.

Starting materials of the formula II*a* can be produced, for example, by condensing compounds of the formula II with primary amines of the formula II*c*:

wherein $R_1$ has the meaning given under formula II*a*, in inert solvents, e.g., in benzene or toluene.

Applying a second process according to the invention, compounds of the formula I are obtained by hydrolysing an ester of a carboxylic acid of the formula I wherein R, X, Y, $Z_1$ and $Z_2$ have the meanings given there; and, optionally, converting an obtained carboxylic acid with an inorganic or organic base into a salt. Such esters are, in particular, lower alkyl esters, e.g., methyl, ethyl, propyl, isopropyl, butyl, isobutyl, or sec. butyl ester.

The hydrolysis can be performed in acid or alkaline medium at ca. 20°–130°C, preferably at the boiling temperature of the solvent. It may be carried out, e.g., in dilute hydrochloric acid, or in a mixture of glacial acetic acid and concentrated hydrochloric acid, which can be optionally diluted with water. Furthermore, the hydrolysis can also be performed, e.g., in an alkanolic or aqueous-alkanolic alkali or alkaline-earth hydroxide solution, or in corresponding carbonate solutions.

From the alkali metal salt solutions or alkaline-earth metal salt solutions of acids of the formula I, which are initially obtained from hydrolysis in alkaline medium, it is possible to obtain direct the corresponding pure alkali metal salts or alkaline-earth metal salts either by concentration or concentration by evaporation, and recrystallisation. The carboxylic acids can, however, also be liberated with an acid, and these carboxylic acids optionally again converted into alkali metal salts or alkaline-earth metal salts.

The esters of the carboxylic acids of the formula I, which are starting materials of the process, can be produced, e.g., starting with compounds of the formula II. These compounds are reacted, e.g., with hydroxy compounds, especially with lower alkanols, e.g., with ethanol, in concentrated sulfuric acid to give the corresponding carboxylic acid esters, e.g., the ethyl esters. These esters can be condensed, analogously to the first process, with the aid of primary amines in inert solvents, such as benzene, to esters, e.g., ethyl esters, of compounds of the formula II*a*. The obtained reaction products can then be reacted with 1-nitroalkanes in glacial acetic acid with the splitting off of primary amines.

The diuretic and saluretic effects of the compounds of the invention are illustratively demonstrated in dogs. Thus it can be shown by conventional pharmacological experiments [cf. E. G. Stenger et al., Schweiz, med. Wochenschr. 89, 1126 (1959)] that for example 2,3-dihydro-5-(2-nitro-1-propenyl)-6,7-dimethyl-benzofuran-2-carboxylic acid 2,3-dihydro-5-(2-nitro-1-butenyl)-6,7-dimethyl-benzofuran-2-carboxylic acid upon oral administration in amounts of about 5 mg/kg to dogs increase the excretion of urine and simultaneously of sodium chloride to a considerable extent, whereby no undesirable side effects are observed.

The new compounds or the pharmaceutically acceptable salts thereof are preferably administrered orally. For salt formation, it is possible to use inorganic or organic bases such as, e.g., alkali metal hydroxides or alkaline-earth metal hydroxides, carbonates or bicarbonates, triethanolamine or choline. The daily dosages vary between 0.5 and 10 mg/kg for mammals. Suitable dosage units, such as dragées or tablets, preferably contain 5–100 mg of an active substance according to the invention, i.e., 20–90 percent of a compound of the formula I. They are produced by combining the active substance, e.g., with solid pulverulent carriers such as lactose, saccharose, sorbitol, mannitol; starches such as potato starch, maize starch or amylopectin, also laminaria powder or citrus pulp powder: cellulose derivatives or gelatine, optionally with the addition of lubricants such as magnesium or calcium stearate, or polyethylene glycols, to give tablets or dragée cores. The latter are coated, e.g., with concentrated sugar solutions which can also contain, e.g., gum arabic, talcum, and/or titanium dioxide; or with a lacquer dissolved in readily volatile organic solvents or mixtures of solvents. Dyestuffs may be added to these coatings, e.g., for identification of the various dosages of active substance. Further suitable dosage units for oral administration are hard gelatine capsules as well as soft closed capsules made from gelatine and a softener, such as glycerin. The former contain the active substance preferably as a granulate in admixture with lubricants, such as talcum or magnesium stearate, and, optionally, stabilisers such as sodium metabisulphite or ascorbic acid. In soft capsules, the active substance is preferably dissolved or suspended in suitable liquids, such as liquid polyethylene glycols, whereby likewise stabilisers may be added.

The following prescriptions serve to further illustrate the production of tablets, dragees and capsules.

a. An amount of 1,000 g of 2,3-dihydro-5-(2-nitro-1-propenyl)-6,7-dimethylbenzofuran-2-carboxylic acid is mixed together with 550 g of lactose and 292 g of potato starch; the mixture is moistened with an aqueous solution of 8 g of gelatine, and granulated through a sieve. After the granulate has been dried, 60 g of potato starch, 60 g of talcum, 10 g of magnesium stearate and 20 g of colloidal silicon dioxide are mixed in, and the mixture is pressed into 10,000 tablets each weighing 200 mg and each containing 100 mg of active substance. The tablets may optionally be provided with grooves for a more precise adjustment of the dosage amount.

b. A granulate is prepared from 1,000 g of 2,3-dihydro-5-(2-nitro-1-propenyl)-6,7-dimethylbenzofuran-2-carboxylic acid, 379 g of lactose, and the aqueous solution of 6 g of gelatine. After drying, the granulate is mixed with 10 g of colloidal silicon dioxide, 40 g of talcum, 60 g of potato starch and 5 g of magnesium stearate; the mixture is then pressed into 10,000 dragée cores. These are subsequently coated with a concentrated syrup made from 533.5 g of crystallised saccharose, 20 g of shellac, 75 g of gum arabic, 250 g of talcum, 20 g of colloidal silicon dioxide, and 1.5 g of dyestuff, and then dried. The obtained dragées each weigh 240 mg and each contain 100 mg of active substance.

c. To produce 1,000 capsules each containing 100 mg of active substance, 100 g of 2,3-dihydro-5-(2-nitro-1-propenyl)-6,7-dimethylbenzofuran-2-carboxylic acid are mixed with 9.5 g of talcum and 0.5 g of magnesium stearate, and the mixture is put through a sieve (e.g., Sieve IV according to Ph. Helv. V); the mixture is then evenly filled into capsules, size O.

As active substance for the tablets, capsules and dragées, it is also possible to use the same amount of 2,3-dihydro-5-(2-nitro-1-butenyl)-6,7-dimethylbenzofuran-2-carboxylic acid.

The following examples further illustrate the production of the new compounds of the formula I, and of intermediate products not hitherto described; the examples, however, in no way limit the scope of the invention. The temperatures are given in degrees Centigrade.

EXAMPLE 1 a. 2.0 g of 2,3-dihydro-5-(2-nitro-1-propenyl)-6,7-dimethylbenzofuran-2carboxylic acid ethyl ester are refluxed with a mixture of 10 ml of glacial acetic acid, 10 ml of water, and 1 ml of concentrated hydrochloric acid for 1 hour. The reaction mixture is then poured into water, and the obtained emulsion is stirred until crystallisation of the crude product occurs. The crude product is filtered under suction, subsequently washed with a little water, dried under a water-jet vacuum, and recrystallised from benzene. Thus obtained are 1.6 g (88 percent of theoretical value) of 2,3-dihydro-5-(2-nitro-1-propenyl)6,7-dimethylbenzofuran-2-carboxylic acid, M.P. 163°–164°.

The 2,3-dihydro-5-(2-nitro-1-propenyl)-6,7-dimethylbenzofuran-2-carboxylic acid ethyl ester required as starting material is produced as follows:

b. An amount of 45 g of 2,3-dimethylphenol and 50.0 g of malic acid is ground to powder and well mixed together. To the mixture are added 100 ml of concentrated sulphuric acid, and the whole is slowly heated whilst stirring is maintained, so that the reaction temperature is 130° after 30 minutes. The solution is held for a further 30 minutes at this temperature; it is then poured on to 1 kg of ice, and the formed suspension is stirred for 30 minutes. The precipitated crystals are filtered off with suction, and recrystallised from ethanol. In this manner is obtained 7,8-dimethylcoumarin, M.P. 128°–130°.

c. An amount of 34.8 g of the obtained 7,8-dimethylcoumarin is dissolved in 60 ml of chloroform. To this solution is added dropwise a solution of 32.5 g of bromine in 20 ml of chloroform, with stirring and occasional cooling with ice, so that the reaction temperature is 20°–25°. The mixture is stirred for a further 20 minutes at room temperature, and the chloroform subsequently completely evaporated off in vacuo. The residue is added portionwise to a mixture of 90.0 g of potassium hydroxide with 300 ml of ethanol, and the reaction temperature maintained by ice cooling between 30° and 40°. The mixture is afterwards stirred for 30 minutes at 40° and for 30 minutes at 80°, and then poured into 2 litres of ice water. The aqueous alkaline solution is washed twice with 400 ml of ether each time; it is then adjusted with concentrated hydrochloric acid to pH = 2–3, and the obtained suspension stirred for half an hour at room temperature. The precipitated crystals are filtered off under suction, and recrystallised from ethanol. Thus obtained is 6,7-dimethylbenzofuran-2-carboxylic acid, M.P. 237°–239°.

d. An amount of 37.8 g of the carboxylic acid obtained according to (c) is dissolved in 500 ml of a saturated aqueous sodium hydrogen carbonate solution, and the solution cooled in an ice bath to 5°. To the solution are added 500.0 g of 5 percent sodium amalgam, the reaction mixture is removed after 2 hours from the ice bath, and allowed to stand for 24 hours at 20°. The solution is subsequently separated from the mercury, filtered, and the filtrate adjusted to pH 1 with concentrated hydrochloric acid. The formed precipitate is filtered off, washed with 300 ml of water, and dried. The obtained 2,3-dihydro-6,7-dimethylbenzofuran-2-carboxylic acid melts at 182° after recrystallisation from ethanol.

e. 5.0 g of the carboxylic acid obtained according to (d) are cooled in 13 ml of nitrobenzene to 0°; to the cooled solution are then added portionwise at 0° to 10°, with the exclusion of atmospheric moisture, 10.5 g of aluminium chloride. To the mixture are subsequently added dropwise at 0° to 3°, within 20 minutes, 4.5 g of dichloromethylmethyl ether. The mixture is then heated to 20°, stirred for a further 30 minutes, and afterwards carefully poured on to 500 g of ice. The obtained aqueous suspension is extracted twice with 250 ml of ethyl acetate each time. The ethyl acetate solution is then extracted by shaking twice with 100 ml each time of concentrated aqueous sodium hydrogen carbonate solution. The pH-value of the sodium hydrogen carbonate solution is adjusted to 2 with 4-n hydrochloric acid, the crude precipitated carboxylic acid filtered off under suction, dried in vacuo at 60°, and recrystallised from benzene/ethanol. Thus obtained are 2,5 g of 2,3-dihydro-5-formyl-6,7-dimethylbenzofuran-2-carboxylic acid, M.P. 194°–196°; yield 45 percent of the theoretical value.

f. 30.0 g of the carboxylic acid obtained according to (e) are refluxed in 400 ml of absolute ethanol with 30 ml of concentrated sulphuric acid for 3 hours; 300 ml of ethanol are then distilled off, and the residue is distributed between 300 ml of water and 300 ml of ether. The ethereal phase is washed with 200 ml of water, then twice with 100 ml each time of saturated sodium hydrogen carbonate solution, dried over sodium sulphate, and concentrated by evaportion. The residue is distilled under high vacuum. The 2,3-dihydro-5-formyl-6,7-dimethylbenzofuran-2-carboxylic acid ethyl ester boils at 132°–135°/0.02 Torr; yield 26 g, 77 percent of the theoretical value.

g. 20.0 g of the ester obtained according to (f) are refluxed with 5.3 g of butylamine in 100 ml of benzene for 2 hours. The water formed during the reaction is removed by azeotropic distillation. The benzene is subsequently distilled off, and the residue: 2,3-dihydro-5-(N-butyliminomethyl)-6,7-dimethylbenzofuran-2-carboxylic acid ethyl ester used as crude product; yield 31.2 g.

An amount of 9.2 g of this crude product is dissolved in 30 ml of glacial acetic acid, and to the solution are added 9 g of nitroethane. The mixture is refluxed for 10 minutes, then poured into 100 ml of ice water, and the crude product extracted with 100 ml of ether. The ether solution is washed with 50 ml of water, and then, to remove the acetic acid, with concentrated sodium hydrogen carbonate solution; the solution is afterwards dried over magnesium sulphate, and concentrated by evaporation. The residue: 9.1 g of 2,3-dihydro-5-(2-nitro-1-propenyl)-6,7-dimethylbenzofuran-2-carboxylic acid ethyl ester, is used as crude product.

EXAMPLE 2

Analogously to Example 1 (a) is obtained, from 1.5 g of 2,3-dihydro-5-(2-nitro-1-butenyl)-6,7-dimethylbenzofuran-2-carboxylic acid ethyl ester with 10 ml of glacial acetic acid, 10 ml of water and 1 ml of concentrated hydrochloric acid: 2,3-dihydro-5-(2-nitro-1-butenyl)-6,7-dimethylbenzofuran-2-carboxylic acid, M.P. 145°–147° (from ethyl acetate); yield 0.8 g, 58 percent of the theoretical value.

The 2,3-dihydro-5-(2-nitro-1-butenyl)-6,7-dimethylbenzofuran-2-carboxylic acid ethyl ester, M.P. 78°–79° (from ethanol), required as starting material, is obtained analogously to Example 1 (g) from 6.5 g of crude 2,3-dihydro-5-(N-butyliminomethyl)-6,7-dimethylbenzofuran-2-carboxylic acid ethyl ester with 7.2 g of 1-nitropropane in 20 ml of glacial acetic acid. The starting material is used as crude product.

EXAMPLE 3

Analogously to Example 1 (a) is obtained, from 3.2 g of 2,3-dihydro-5-(2-nitro-1-pentenyl)6,7-dimethylbenzofuran-2-carboxylic acid ethyl ester with 20 ml of glacial acetic acid, 20 ml of water and 3 ml of conc. hydrochloric acid: 2,3-dihydro-5-(2-nitro-1-pentenyl-6,7-dimethylbenzofuran-2-carboxylic acid, M.P. 145°–146° (from benzene); yield 2.5 g, 85 percent of the theoretical value.

The 2,3-dihydro-5-(2-nitro-1-pentenyl)-6,7-dimethylbenzofuran-2-carboxylic acid ethyl ester required as starting material is produced, analogously to Example 1 (g), from 6.5 g of crude 2,3-dihydro-5-(N-butyliminomethyl)-6,7-dimethylbenzofuran-2-carboxylic acid ethyl ester with 8.2 g of 1-nitrobutane in 20 ml of glacial acetic acid. The starting material is used as crude product.

EXAMPLE 4

Analogously to Example 1 (a) is obtained, from 4.0 g of 2,3-dihydro-5-(2-nitro-1-heptenyl)-6,7-dimethylbenzofuran-2-carboxylic acid ethyl ester with 20 ml of glacial acetic acid, 20 ml of water and 3 ml of concentrated hydrochloric acid: 2,3-dihydro-5-(2-nitro-1-heptenyl)-6,7-dimethylbenzofuran-2-carboxylic acid, M.P. 133°–134° (from benzene); yield 3.1 g, 84 percent of the theoretical value.

The 2,3-dihydro-5-(2-nitro-1-heptenyl)-6,7-dimethylbenzofuran-2-carboxylic acid ethyl ester is produced, analogously to Example 1 c), from 6.5 g of crude 2,3-dihydro-5-(N-butyliminomethyl)-6,7-dimethylbenzofuran-2-carboxylic acid ethyl ester with 10.5 g of 1-nitrohexane in 20 ml of glacial acetic acid. The starting material is used as crude product.

EXAMPLE 5

An amount of 2.0 g of 2,3-dihydro-5-formyl-6,7-dimethylbenzofuran-2-carboxylic acid is refluxed with 50 ml of toluene, 20 ml of glacial acetic acid, 5 ml of 1-nitropropane and 0.5 ml of piperidine for 7 hours. The water forming during the reaction is continuously removed by azeotropic distillation. The reaction mixture is then cooled; to the mixture are added 100 ml of ether, the ether solution washed three times with 100 ml of water each time, dried over magnesium sulphate, and concentrated by evaporation. The residue is crystallised from glacial acetic acid, and 2,3 g of 2,3-dihydro-5-(2-nitro-1-butenyl)-6,7-dimethyl-benzofuran-2-carboxylic acid are obtained, m.p 145° – 147°.

EXAMPLE 6 a. Analogously to Example 5 are obtained, from 3.0 g of 2,3-dihydro-5-formyl-6-methoxybenzofuran-2-carboxylic acid with 5 ml of nitroethane and 0.7 ml of piperidine in 75 ml of toluene and 15 ml of glacial acetic acid: 1.8 g of 2,3-dihydro-5-(2-nitro-1-propenyl)-6-methoxybenzofuran-2-carboxylic acid, M.P. 180°–182° (from ethanol); yield 47 percent of the theoretical value.

The 2,3-dihydro-5-formyl-6-methoxybenzofuran-2-carboxylic acid used as starting material is produced starting with 2,3-dihydro-6-methoxybenzofuran-2-carboxylic acid [cp. W. Will and P. Beck, Chem.Ber. 19, 1783 (1886)]. An amount of 70 g of this acid is reacted, analogously to Example 1 (e), with 74 g of dichloromethylmethyl ether and 140 g of aluminium chloride in 200 ml of nitrobenzene to give 2,3-dihydro-5-formyl-6-methoxybenzofuran-2-carboxylic acid, M.P 212°–214° (from ethyl acetate/dioxane); yield 38 g, 48 percent of the theoretical value.

EXAMPLE 7 a. Analogously to Example 5 are obtained, from 4 g of 2,3-dihydro-3,6-dimethyl-5-formylbenzofuran-2-carboxylic acid with 5 ml of nitroethane and 1 ml of piperidine in 70 ml of toluene with 27 ml of glacial acetic acid: 2.2 g of 2,3-dihydro-3,6-dimethyl-5-(2-nitro-1-propenyl)-benzofuran-2-carboxylic acid, M.P. 131°–133° (from benzene/cyclohexane); yield 44 percent of the theoretical value.

The 2,3-dihydro-3,6-dimethyl-5-formylbenzofuran-2-carboxylic acid used as starting product is produced as follows:

b. An amount of 15.2 g of 2,3-dihydro-3,6-dimethylbenzofuran-2-carboxylic acid [cp. K. Fries, G. Fickewirth, Ann.Chem. 362, 49 (1908)] is mixed by stirring with 40 ml of nitrobenzene. To this mixture are added portionwise, with ice cooling, 32 g of powdered anhydrous aluminium chloride, the addition being made in such a manner that the temperature does not exceed 10°. The reaction mixture is subsequently cooled to 0°, and 14 g of dichloromethylmethyl ether are then added within 30 minutes. The suspension is stirred for a further 30 minutes at room temperature, then poured on to 250 g of ice, and to the mixture are added 250 ml of ether. The ether phase is separated, washed with 50 ml of water, and extracted twice, using each time 50 ml of conc. sodium hydrogen carbonate solution. The sodium hydrogen carbonate extract is adjusted with hydrochloric acid to pH 1–2, and the formed precipitate filtered off under suction. The precipitate is dried and crystallised from glacial acetic acid. Thus obtained are 6 g of 2,3-dihydro-3,6-dimethyl-5-formylbenzofuran-2-carboxylic acid, M.P. 199°–200°; yield 35 percent of the theoretical value.

EXAMPLE 8 a. Analogously to Example 5 is obtained, from 3.5 g of 2,3-dihydro-5-formyl-6-chlorobenzo[b]thiophene-2-carboxylic acid, 7 ml of nitroethane and 1.5 ml of piperidine in 53 ml of toluene and 23 ml of glacial acetic acid: 2,3-dihydro-5-(2-nitro-1-propenyl)-6-chlorobenzo[b]thiophene-2-carboxylic acid, M.P. 165°–167° (from ethyl acetate); yield 0.8 g, 19 percent of the theoretical value.

The starting product: 2,3-dihydro-5-formyl-6-chlorobenzo[b]thiophene-2-carboxylic acid, is produced as follows:

b. A mixture of 96 g of rhodanine, 169 g of anhydrous sodium acetate and 450 ml of glacial acetic acid is heated to 100°. To the obtained solution are added 126 g of 2,4-dichlorobenzaldehyde, dissolved in 225 ml of glacial acetic acid. A suspension is formed which is refluxed for 30 minutes. The hot reaction mixture is then poured into 6 litres of ice water, whereupon 5-(2,4-dichlorobenzylidene)-rhodanine precipitates and is filtered off under suction and washed with water.

The obtained crude product is dissolved in 2 litres of 5 percent aqueous sodium hydroxide with heat being applied. Traces of 2,4-dichlorobenzaldehyde are precipitated from the cooled solution and are filtered off. To the filtrate is quickly added excess concentrated hydrochloric acid; the whole is again cooled, and the precipitated 2,4-dichloro-α-mercaptocinnamic acid filtered off. The acid is taken up in ether, the ether solution dried over sodium sulphate, and concentrated by evaporation. The residue is heated with 1,350 ml of diethylene glycol and 117 g of sodium methylate to 150°–160° (internal temperature), and stirred for 1 hour at this temperature. Methanol thereby distills off.

The mixture is then poured on to 5 kg of ice, and with hydrochloric acid made acid to a Congo indicator. 6-Chlorobenzo[b]thiophene-2-carboxylic acid precipitates, is filtered off, and recrystallised from dioxane/ethyl acetate, m.p. 283°;

c. An amount of 40.4 g of the carboxylic acid obtained according to (b) is reduced, analogously to Example 1 (d), with 500 g of aqueous 5 percent sodium amalgam to give 2,3-dihydro-6-chlorobenzo[b]thiophene-2-carboxylic acid, M.P. 196°–198°.

d. Analogously to Example 1(e) is obtained, from 16.8 g of the carboxylic acid obtained in (c) with 14 g of dichloromethylmethyl ether, in the presence of 31.6 g of aluminium chloride in 42 ml of nitrobenzene: 2,3-dihydro-5-formyl-6-chlorobenzo[b]thiophene-2-carboxylic acid, M.P. 167°–170° (from ethyl acetate); yield 7.9 g, 42 percent of the theoretical value.

EXAMPLE 9

Analogously to Example 5 are obtained from 2 g of 2,3-dihydro-5-formyl-6,7-dimethyl-benzofuran-2-carboxylic acid, 5 ml of nitroethane and 0.5 ml of piperidine in 50 ml of toluene and 20 ml of glacial acetic acid, 2.1 g of 2,3-dihydro-5-(2-nitro-1-propenyl)-6,7-dimethyl-benzofuran-2-carboxylic acid, m.p. 163°–164°; yield 83 percent of theory.

EXAMPLE 10 a. Analogously to Example 1 are obtained from 0.8 g of crude 2,3-dihydro-5-(2-nitro-1-propenyl)-6-chlorobenzo[b]thiophene-2-carboxylic acid ethyl ester, 5 ml of glacial acetic acid, 5 ml of water and 0.5 ml of concentrated hydrochloric acid, 0.5 g of 2,3-dihydro-5-(2-nitro-1-propenyl)-6-chloro-benzo[b]thiophene-2-carboxylic acid, m.p. 165°–167° (from ethyl acetate); yield 68 percent of theory.

The ester required as starting material is prepared as follows:

b. 3.0 g of 2,3-dihydro-5-formyl-6-chloro-benzo[b]thiophene-2-carboxylic acid [cf. Example 8(d)] are refluxed for 3 hours in 40 ml of absolute ethanol with 3 ml of concentrated sulphuric acid. 30 ml of ethanol are then removed by distillation under vacuum and the residue is partitioned between 30 ml of water and 30 ml of ether. The ethereal phase is washed once with 20 ml of water, then twice with 10 ml of saturated sodium hydrogen carbonate solution, dried over sodium sulphate and evaporated. The residue is distilled under high vacuum to give 24 g of 2,3-dihydro-5-formyl-6-chloro-benzo[b]thiophene-2-carboxylic acid ethyl ester, b.p. 137°–145°/0.02 Torr; yield 70 percent of theory;

c. 2.2 g of the ester prepared in (b) are reacted analogously to Example 1 (g) with 0.53 g of butylamine in 20 ml of benzene to give crude 2,3-dihydro-5-(N-butyliminomethyl)-6-chloro-benzo[b]thiophene-2-carboxylic acid ethyl ester which with 1.3 g of nitroethane in 5 ml of glacial acetic acid gives 2,3-dihydro-5-(2-nitro-1-propenyl)-6-chloro-benzo[b]-thiophene-2-carboxylic acid ethyl ester which is used in its crude form.

What is claimed is:

1. A pharmaceutical composition in oral dosage unit form comprising a pharmaceutical carrier and a compound of the formula

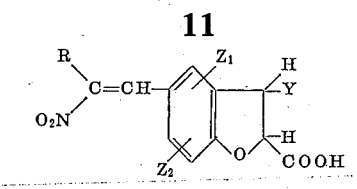

wherein Y is hydrogen or methyl,
$Z_1$ is fluoro, chloro, methyl or methoxy,
$Z_2$ is hydrogen or methyl, and
R is alkyl having from 1 to 5 carbon atoms;
or a pharmaceutically acceptable salt thereof, in an amount sufficient to produce a diuretic and a saluretic effect upon administration of said dosage unit form.

2. A composition as claimed in claim 1, wherein 2,3-dihydro-5-(2-nitro-1-propenyl)-6,7-dimethyl-benzofuran-2-carboxylic acid is used.

3. A composition as claimed in claim 1, wherein 2,3-dihydro-5-(2-nitro-1-butenyl)-6,7-dimethyl-benzofuran-2-carboxylic acid is used.

4. A method of producing diuresis and saluresis in a mammal which method comprises orally administering to said mammal a diuretically and saluretically effective amount of a compound according to claim 1.

* * * * *